US006986543B2

(12) United States Patent  
Reed

(10) Patent No.: US 6,986,543 B2
(45) Date of Patent: Jan. 17, 2006

(54) AUTOMOTIVE INTERIOR TRIM ASSEMBLY AND PAD INSERTION

(75) Inventor: Randy S. Reed, Fair Haven, MI (US)

(73) Assignee: Lear Corporation, Southfield, MI (US)

( * ) Notice: Subject to any disclaimer, the term of this patent is extended or adjusted under 35 U.S.C. 154(b) by 11 days.

(21) Appl. No.: 10/709,698

(22) Filed: May 24, 2004

(65) Prior Publication Data

US 2005/0258666 A1 Nov. 24, 2005

(51) Int. Cl.
*B60J 9/00* (2006.01)
(52) U.S. Cl. ..................................... 296/153
(58) Field of Classification Search ............... 296/153, 296/1.09, 37.8; 297/411.45, 411.46
See application file for complete search history.

(56) References Cited

U.S. PATENT DOCUMENTS

| 4,919,470 | A |   | 4/1990 | Muller ..................... 296/153 |
| 5,626,382 | A |   | 5/1997 | Johnson et al. ......... 296/146.7 |
| 5,893,601 | A | * | 4/1999 | Carlberg ................... 296/153 |
| 5,902,006 | A |   | 5/1999 | Janker et al. ............. 296/153 |
| 5,906,409 | A |   | 5/1999 | DeRees et al. ......... 296/146.7 |
| 5,951,094 | A | * | 9/1999 | Konishi et al. ........... 296/153 |
| 6,092,858 | A |   | 7/2000 | Bolwell ................... 296/146.7 |
| 6,899,363 | B2 | * | 5/2005 | Dry ......................... 296/1.09 |

* cited by examiner

*Primary Examiner*—Stephen Gordon
(74) *Attorney, Agent, or Firm*—Wood, Herron & Evans, LLP

(57) ABSTRACT

A trim assembly comprises a substrate member forming at least a portion of the structural support of the trim assembly. A flexible skin overlies at least a portion of the substrate member and is coupled to the substrate. The substrate and flexible skin are configured to define a cavity having an opening. A back plate is mountable to the substrate and adapted to cover the cavity opening. A resilient foam pad contained within a pouch is positioned within the cavity to provide a soft feel to the trim assembly. The foam pad is inserted into the cavity using a tool that pulls a vacuum and compresses the foam pad. The foam pad is insertable into the cavity while in a compressed state and is adapted to expand so as to substantially fill the cavity.

9 Claims, 2 Drawing Sheets

AUTOMOTIVE INTERIOR TRIM ASSEMBLY AND PAD INSERTION

FIELD OF THE INVENTION

The present invention pertains generally to automotive interiors and more particularly to trim assemblies for automotive interiors.

BACKGROUND OF THE INVENTION

It is known to provide automotive interiors with various trim assemblies to improve the aesthetic appearance of the automotive interior and for the comfort and convenience of vehicle occupants. Examples of these interior trim assemblies include the instrument panels, armrests, door trim panels and consoles. For example, armrests are typically secured to a vertical panel of the automotive interior such as a door panel and project inboard from the door trim panel to provide a convenient rest for an occupant's arm. To further increase the aesthetic appearance of the trim assemblies and to improve the comfort and convenience to vehicle occupants, it is often desired to form at least portions of the trim assemblies with areas which are soft to the touch. Typically, these soft areas have been formed by providing a resilient padding material beneath a pliable surface layer such as leather, vinyl, or fabric material.

One conventional method of forming a trim assembly with padded material includes injecting a foam material between a rigid substrate and a skin layer joined to the substrate. In another conventional method, a preformed, soft, resilient pad is secured to a rigid plastic shell and a pliable skin layer is stretched over the pad and secured to the shell to form the trim assembly. These prior methods are generally costly due to the multiple components and manufacturing steps required to make the padded trim assemblies.

Various other trim assemblies have been manufactured using a two-shot molding process wherein a relatively soft skin layer is formed over a hard substrate material without padding. The substrate and skin layer are formed so as to provide a recess or cavity for inserting a resilient padding material that provides a soft feel to the trim assembly. To insert the padding material into the recess, the padding material is secured to a top surface of a rigid pad carrier which facilitates the insertion of the pad material into the cavity. A separate closeout or back plate then couples to the substrate to cover the opening to the cavity and encloses the pad carrier and pad material within the cavity. Inserting the pad material into trim assemblies and securing the pad material and pad carrier therein requires additional components that increase the overall manufacturing cost of the trim assemblies.

There is a need for an improved trim assembly and a method for inserting foam padding into a trim assembly that reduces the number of components and further reduces manufacturing costs.

SUMMARY OF INVENTION

The present invention provides an automotive interior trim assembly that exhibits a soft feel, but which can be produced in an efficient and cost-effective manner. The trim assembly may be formed as an instrument panel, an armrest, a door panel, a console or other interior trim component that would benefit from having at least some areas which are soft to the touch.

In one embodiment, the trim assembly comprises a substrate member forming at least part of a structural support of the trim assembly and a flexible skin overlying at least a portion of the substrate member and coupled to the substrate member. The substrate and flexible skin are configured to define a cavity having an opening. The trim assembly further includes a back plate mountable to the substrate member and adapted to cover the cavity opening. A resilient foam pad contained within a pouch is positioned within the cavity to provide a soft feel to the trim assembly.

The foam pad is inserted into the cavity when the foam pad is in a compressed state. This may be done by placing the foam pad within the pouch and placing the foam pad under vacuum. The pouch is then sealed such that the interior of the pouch remains under vacuum and the foam pad remains in a compressed state. The foam pad is then inserted into the cavity while in the compressed state. Once positioned in the cavity, the vacuum is relieved. This may be done by inserting a piercing member through an aperture in the back plate to pierce the pouch thereby relieving the vacuum within the pouch. This causes the foam pad to expand so as to substantially fill the cavity and provide a soft feel to the trim assembly.

The features and objectives of the present invention will become more readily apparent from the following Detailed Description taken in conjunction with the accompanying drawings.

BRIEF DESCRIPTION OF DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
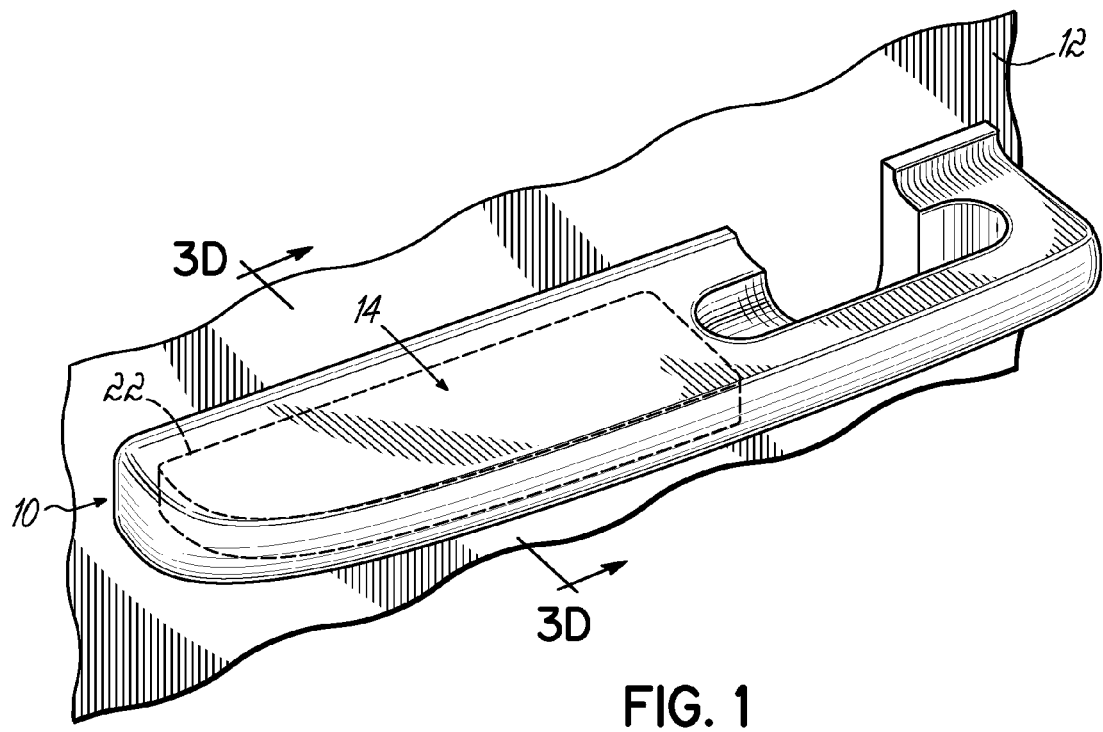
FIG. 1 is a perspective view of an exemplary automotive interior trim assembly according to the present invention, in the form of an armrest.

Referring to FIG. 1, there is shown an exemplary automotive interior trim assembly of the present invention, in the form of an armrest 10. The armrest 10 is attached to a vertical panel 12 within the interior of an automobile, such as a door panel. In the embodiment shown, the armrest 10 includes a first portion 14 providing a horizontal surface upon which a vehicle occupant may rest their arm. It is often desirable that first portion 14 of armrest 10 provide for a soft feel.

With continued reference to FIG. 1, and referring further to FIGS. 2 and 3A–3E, the armrest 10 of the present invention includes a rigid substrate member 16, a flexible skin layer 18, a back plate 20 and a resilient foam pad 22 contained within a pouch 24. Substrate member 16 comprises a generally planar substrate that forms at least a part of the structural support of the armrest 10 and is adapted to be mounted to the door panel 12. The substrate member 16 is generally injection molded and formed from filled or unfilled polypropylene, thermoplastic olefin elastomers, acrylonitrile butadiene styrene, styrene maleic anhydride, polycarbonate/acrylonitrile butadiene styrene alloy, or other suitable materials for forming the rigid substrate member 16.

Figure 2:
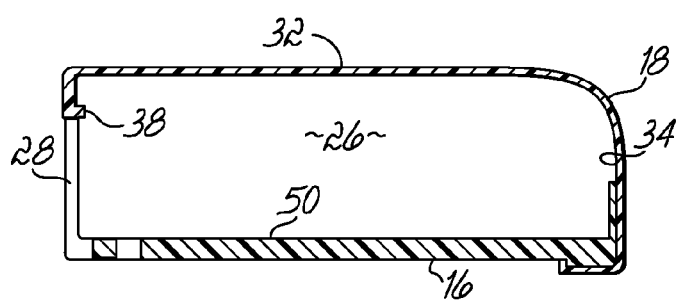
FIG. 2 is a cross-sectional view of the armrest of FIG. 1, without the foam pad.

Flexible skin layer 18 is disposed over at least a portion of the substrate member 16 and coupled thereto. For example, flexible skin 18 may be integrally molded to substrate member 16 by a known process such as over molding. As best shown in FIG. 2, flexible skin layer 18 and substrate member 16 are configured so as to define a cavity 26 having an opening 28. Cavity 26 may be generally rectangular having substrate member 16 bounding the bottom of the cavity and flexible skin 18 bounding top and side surfaces of the cavity. Flexible skin 18 is generally injection molded and may be formed from polyvinyl chloride, thermoplastic olefin elastomers or other suitable materials for forming a flexible skin over the substrate member 16.

A back plate 20 is mountable to the substrate 16 and is configured to cover the opening 28 to cavity 26. When back plate 20 is removed or not mounted to substrate 16, the opening 28 of cavity 26 is accessible. Back plate 20 may further include a recess 36 and flexible skin 18 may further include a tab 38 such that when back plate 20 is mounted to substrate 16, tab 38 engages recess 36 to secure back plate 20 in a closed position covering opening 28. Back plate 20 further includes an aperture 40 extending through back plate 20 and adapted to permit a piercing member 42 to be inserted through aperture 34, opening 28 and into cavity 26. The back plate 20 is generally injection molded and generally formed from the same or similar materials as is the substrate member 16.

As shown in FIGS. 3A–3E a resilient foam pad 22 contained within a pouch 24 is positioned in cavity 26 so as to be between the flexible skin 18 and the substrate member 16 and to provide a soft feel to armrest 10. Foam pad 22 and pouch 24 are insertable into cavity 26 through opening 28 when back plate 20 is not mounted to substrate 16. Foam pad 20 includes a top surface 44 and side surface 46 that abut the underside of top surface 32 and side surface 34 respectively of the flexible skin 18, and a bottom surface 48 that abuts a top surface 50 of substrate member 16. The pouch 24 is sandwiched between the foam pad 22 and the top surface 32 and side surface 34 of the flexible skin 18 and the top surface 50 of substrate 16. When a load is applied to the top surface of the armrest 10, such as when an occupant rests his/her arm on the armrest, the flexible skin 18, pouch 24 and the resilient foam pad 20 deform thereby providing a soft feel to armrest 10.

Foam pad 20 can be die-cut so as to conform to the geometric shape of cavity 26 and may be formed from vinyl nitrile resins as well as one of the polymeric resins, such as EPDM, polypropylene, polyethylene or other suitable materials. The foam may be comprised solely of open cell foam or be a combination of open and closed cell foam. For instance, and as shown in FIGS. 3A–3E, the foam pad 22 may be comprised of a top layer 22(a) made from open cell foam and a bottom layer 22(b) made from a closed cell foam. The foam layers 22(a) and 22(b) may be bonded together, for instance using a pressure sensitive adhesive, to form the foam pad 22. Depending on the particular application, the foam pad 22 may be formed with as much as 100% open cell foam 22(a) or as little as 10% open cell foam 22(a), with the closed cell foam 22(b) making up the remainder of the foam pad 22. In a preferred embodiment, the foam pad comprises 75% open cell foam 22(a) and 25% closed cell foam 22(b). The closed cell foam provides some measure of support and rigidity to the foam pad 22 while the open cell foam provides the soft feel.

The pouch 24 is generally formed from thin sheets of material that have sufficient strength to retain the foam pad therein, while being generally gas impermeable. For example, the pouch may be made from vinyl, low density polyethylene (LDPE) or other suitable materials known in the art. The pouches generally have an opening along one end for inserting the foam pad 22 therein. Moreover, the pouch 24 is amenable to sealing along the opening of the pouch, such as by heat sealing.

The present invention utilizes the pouch 24 and a vacuum process for inserting foam pad 22 within cavity 26. FIGS. 3A–3E sequentially illustrate the insertion of foam pad 22 within cavity 26 using the pouch/vacuum process. As is known in the art, pulling a vacuum on a foam pad 22 causes the foam pad 22 to compress inwardly, thereby decreasing the size of the foam pad 22. Because of its reduced size, it is advantageous to insert the foam pad 22 within the cavity 26 while the foam pad 22 is in the compressed state. According to the invention, this may be accomplished by inserting a foam pad 22 within a pouch 24 and then pulling a vacuum on the foam pad 22 while in the pouch 24 thereby compressing the foam pad 22. Those skilled in the art will recognize alternate ways to get a compressed foam pad 22 in a pouch 24, such as compressing foam pad 22 prior to insertion into pouch 24. While in the compressed state, the pouch 24 is fluidly sealed from the external environment so as to prevent any air from entering the pouch 24. This maintains the vacuum within the pouch 24 and keeps the foam pad 22 in a compressed state.

Figure 3A:
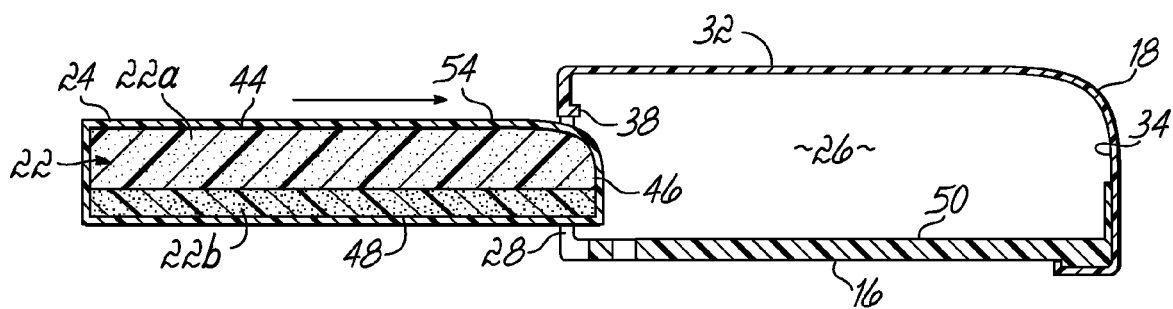
FIGS. 3A–3E are sequential cross-sectional views illustrating the insertion of a resilient foam pad into the armrest of FIG. 1 according to the present invention.
Figure 3B:
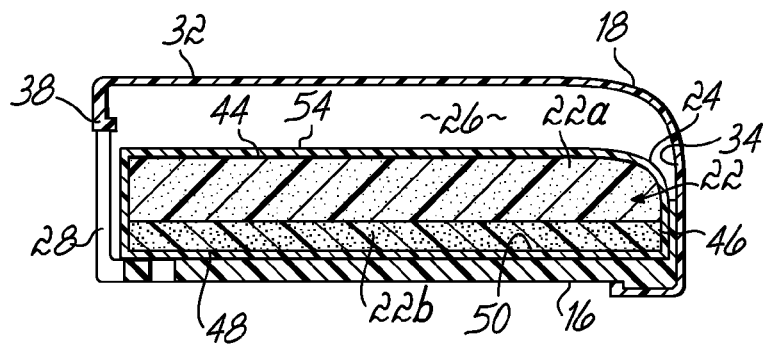
Figure 3C:
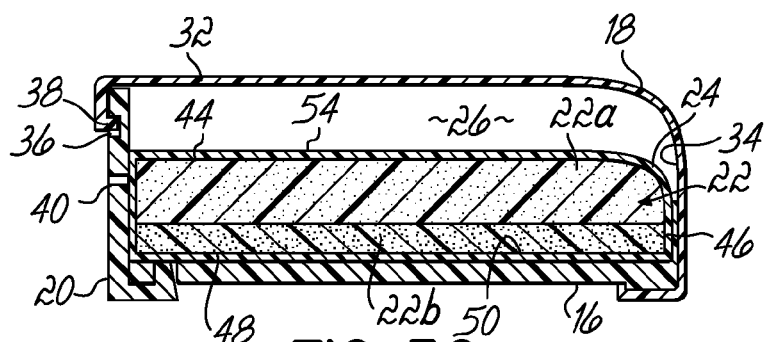
Figure 3D:
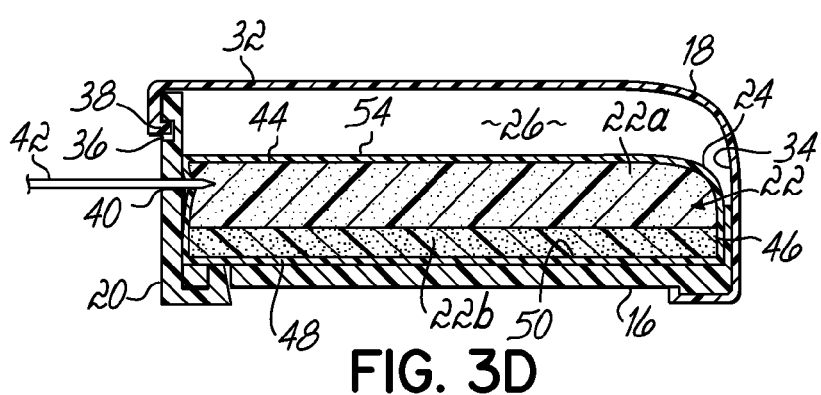
Figure 3E:
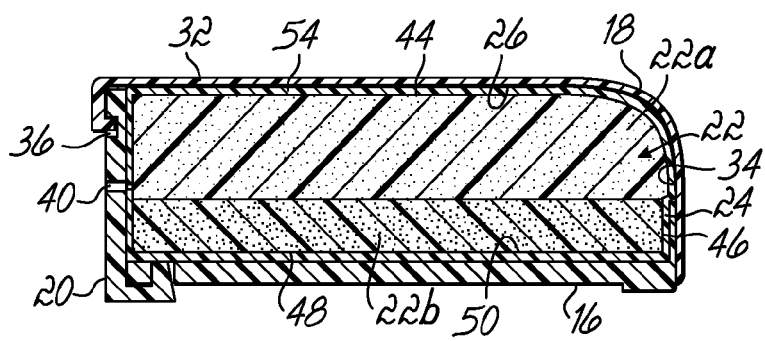

As shown in FIGS. 3A and 3B, with the foam pad 22 in the compressed state and back plate 20 not yet mounted or removed from substrate 16, the foam pad 22 and pouch 24 created by the vacuum seal process may be easily and conveniently inserted through opening 28 and into cavity 26. The foam pad 22 is placed on the top surface 50 of substrate 16 so that the bottom surface 48 of the foam pad 22 overlies top surface 50, as shown in FIG. 3B. As shown in FIG. 3C, when the foam pad 22 and pouch 24 are properly positioned within cavity 26, the back plate 20 is mounted to substrate 16 and secured to flexible skin 18 by engaging tab 38 with recess 36 thereby closing off opening 28 and securing the foam pad 22 and pouch 24 within the cavity 26. A piercing member 42, such as for example, a pin, is then inserted through the aperture 40 in back plate 20 so as to pierce or form a hole in pouch 24, as shown in FIG. 3D. When the piercing member 42 pierces pouch 24, the vacuum within pouch 24 is relieved allowing air from the external environment to flow into pouch 24. This in turn, causes the foam pad 22 to expand thereby substantially filling cavity 26 and providing a soft feel to the armrest 10.

In some cases, it is advantageous to bond the outer surface 54 of a top portion of pouch 24 to the flexible skin 18 along the underside of top surface 32 of flexible skin 18. This eliminates any relative movement between the pouch 24 and the flexible skin 18 along the underside of top surface 32 which in turn reduces or eliminates any noise the pouch 24 might make when an occupant rests his/her arm on armrest 10. As is known in the art, this may be accomplished by placing a release film (not shown) on the underside of top surface 32 so as to keep this surface tacky and thereby retaining its adhesive properties. The release film is then pulled from the underside of top surface 32 prior to piercing pouch 24. In this way, when pouch 24 is pierced and foam pad 22 expands within the cavity 26, the outer surface 54 of the pouch 24 contacts and adheres to the underside of top surface 32 of flexibly skin 18. The method of inserting the foam pad 22 within cavity 26 using the vacuum sealed pouch 24 as described herein is advantageous in that the pad carrier of previous armrests is completely eliminated thus reducing the number of components and consequently reducing the cost of manufacturing the trim assembly.

While the interior trim assembly has been shown and described herein as an armrest 10, it will be recognized that the interior trim assembly of the present invention may alternatively be formed to create a door trim panel, an instrument panel, a console or other interior components of an automobile.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive interior trim assembly comprising:
   a substrate member forming at least part of a structural support of the trim assembly;
   a flexible skin overlying at least a portion of said substrate member and coupled to said substrate member, said flexible skin and said substrate member defining a cavity having an opening;
   a back plate mounted to said substrate member for covering said cavity opening; and
   a resilient foam pad contained within a pouch and positioned within said cavity to provide a soft feel to the trim assembly, said foam pad insertable in said cavity when said foam pad is in a compressed state, said foam pad adapted to expand so as to substantially fill said cavity.

2. The trim assembly of claim 1, wherein said back plate includes an aperture therethrough adapted to receive a piercing member for piercing said pouch.

3. The trim assembly of claim 1, wherein said foam pad comprises:
   a first portion being an open cell foam; and
   a second portion being a closed cell foam.

4. The trim assembly of claim 3, wherein said foam pad has an upper and lower portion, said open cell foam is in said upper portion and said closed cell foam is in said lower portion.

5. The trim assembly of claim 1, wherein said flexible skin is integrally molded to said substrate member.

6. The trim assembly of claim 1, wherein said flexible skin includes a tab, said back plate includes a recess, said tab engaging said recess to couple said flexible skin to said back plate.

7. The trim assembly of claim 1, wherein at least a portion of said pouch is adhered to said flexible skin.

8. The trim assembly of claim 1 configured as an armrest for an automobile.

9. An automotive door trim assembly, comprising:
   an interior door trim panel adapted to be secured to an automobile door; and
   an armrest assembly, comprising:
      a substrate member forming at least part of a structural support of said armrest assembly and mounted to said interior door trim panel;
      a flexible skin overlying at least a portion of said substrate member and coupled to said substrate member, said flexible skin and said substrate member defining a cavity having an opening;
      a back plate mounted to said substrate member for covering said cavity opening; and
      a resilient foam pad contained within a pouch and positioned within said cavity to provide a soft feel to the trim assembly, said foam pad insertable in said cavity when said foam pad is in a compressed state, said foam pad adapted to expand so as to substantially fill said cavity.

* * * * *